US006238793B1

(12) United States Patent
Takahashi et al.

(10) Patent No.: US 6,238,793 B1
(45) Date of Patent: May 29, 2001

(54) METHOD FOR PRODUCTION OF A LOW DENSITY POLYETHYLENE-LAMELLAR SILICATE COMPOSITE MATERIAL

(75) Inventors: Tatsuhiro Takahashi; Toshikazu Kobayashi, both of Kanagawa; Tsunemi Monma, Fukushima; Takayuki Arai, Ibaraki, all of (JP)

(73) Assignees: E. I. du Pont de Nemours and Company, Wilmington, DE (US); Kunimine Industries Company, Ltd., Tokyo (JP)

( * ) Notice: Subject to any disclaimer, the term of this patent is extended or adjusted under 35 U.S.C. 154(b) by 0 days.

(21) Appl. No.: 08/960,610

(22) Filed: Oct. 29, 1997

(30) Foreign Application Priority Data

Nov. 1, 1996 (JP) ........................................ 8-305510

(51) Int. Cl.[7] .............................. B32B 5/16; B32B 13/12; B32B 9/04; C08K 3/34
(52) U.S. Cl. ......................... 428/403; 428/407; 428/363; 428/451; 428/454; 428/500; 524/442; 524/582
(58) Field of Search ................................... 428/500, 688, 428/451, 454, 363, 403, 407; 524/442, 492, 493, 582

(56) References Cited

U.S. PATENT DOCUMENTS

| 5,385,776 | 1/1995 | Maxfield et al. | 428/297 |
| 5,747,575 | * 5/1998 | Nishida et al. | 524/443 |
| 5,883,173 | * 3/1999 | Elspass et al. | 524/446 |

FOREIGN PATENT DOCUMENTS

| 58-35211 | 8/1983 | (JP) . |
| 58-35542 | 8/1983 | (JP) . |
| 62-74957 | 4/1987 | (JP) . |
| 8-65355 | 2/1996 | (JP) . |
| WO 97/31973 | * 9/1997 | (WO) . |

OTHER PUBLICATIONS

Chuzo Kato, Complexes of Clay and Organic Polymers, *Polymers*, 19, No. 222, 758–764, 1970.
Chuzo Kato and Kazuyuki Kuroda, Intercalation Compounds of Clays, *Clay Science*, 26, No. 4, 292–305, 1986.
Makoto Kato, et al., Synthesis and Properties of Polypropylene–Clay Hybrid, *Polymer Processing Technology Discussion Meeting Lecture Material*, 53–54, 1995.

* cited by examiner

*Primary Examiner*—Paul Thibodeau
*Assistant Examiner*—Holly C. Rickman

(57) ABSTRACT

The present invention is a low-density polyethylene-lamellar silicate composite material, and a manufacturing method thereof.

2 Claims, 3 Drawing Sheets

METHOD FOR PRODUCTION OF A LOW DENSITY POLYETHYLENE-LAMELLAR SILICATE COMPOSITE MATERIAL

BACKGROUND OF THE INVENTION

This patent application claims priority to Japanese Patent Application No. 8-305510, filed Nov. 1, 1996, which is incorporated herein by reference.

1. Field of Invention

The present invention pertains to a composite material made of a low-density polyethylene and a lamellar silicate, and it further pertains to a composite material with high transparency achieved through the thorough dispersing of a lamellar silicate with a low-density polyethylene produced by inserting a low-density polyethylene between the silicate layers of a lamellar silicate. A film made of the low-density polyethylene-lamellar silicate composite material of the present invention is transparent and has excellent gas-barrier properties, and an injection molding made thereof has greater rigidity while maintaining a glossy surface, and is used effectively for moldings that require both a high-gloss surface and rigidity such as bumpers for vehicles and OA machines.

2. Background

In the past, many attempts have been made to produce a composite material by inserting an organic polymer material between silicate layers that comprise a lamellar silicate. That research is summarized in Chuzo Kato (Polymers, 1970, Vol. 19, No. 222, pp. 758–764), and Chuzo Kato and Kazuyuki Kuroda (Clay Science, 1986, Vol. 26, No. 4, pp. 292–305), etc. However, it has not been possible to increase the distance between layers through insertion of an organic polymer material between the silicate layers or dispersion of a clay mineral, even when the parallelism between layers is reduced.

As a composite material developed to eliminate the above-mentioned problem, a clay mineral/polyamide resin composition produced by polymerization of the silicate layer that forms an expandable clay mineral with an alkylamine expanding agent after performing treatment, as needed, and further impregnating with a monomer is known (Japanese Kokai Patent Application Nos. Sho 58[1983]-35211 and Sho 58[1983]-35542). Also, a composite material produced by mixing a resin containing a polyamide with a silicate layer having a thickness of the silicate layer that forms the lamellar silicate in the range of 7–12 Å (angstroms) and a layer to layer distance of at least 30 Å has been reported (Japanese Kokai Patent Application No. Sho 62[1987]-74957). In manufacturing the above-mentioned composite materials, a polymerization reaction is included in the production process; thus, production is not necessarily easy.

As a material that can be produced without difficulty in the production process, a resin composition containing a composite material produced by hot-melt kneading of a lamellar silicate/alkylamine expanded composite material prepared by first dispersing a low-density polyethylene and an alkylamine expansion agent with a polyamide to increase the distance between layers to at least 30 Å and to reduce the parallelism between layers has been reported (U.S. Pat. No. 5,385,776).

Furthermore, the applicant has developed a method for manufacturing a composite material consisting of dispersing mixing, drying and pulverizing a polar organic polymer material that can be dissolved or dispersed in water and can be hot-melt mixed with a lamellar silicate in order to produce a composite material having good thermostability that can be easily produced and is capable of dispersing a lamellar silicate even when an organic polymer material other than polyamide is used (Japanese Patent Application No. Hei 8[1996]-65355).

As shown, the above-mentioned technologies concern composite materials produced by dispersing a lamellar silicate in a polymer having a polar group in an organic polymer such as a polyamide and an ionomer, and the focus is on composite materials made primarily of a polar polymer. In this case, the low-density polyethylene includes a polar group, thus, affinity with nonpolar polymers is inadequate, and adequate dispersion cannot be achieved; as a result, transparency is lost.

However, in recent years, studies on dispersing a lamellar silicate in a nonpolar polymer have been carried out. For example, as a method for manufacturing a composite material consisting of dispersing montmorillonite in a polymer, a method in which ion-exchange treatment is performed for a sodium montmorillonite with distearyldimetylammonium in water, followed by washing, pulverization and drying to produce an organic montmorillonite, a reaction is performed with an oligomer in an organic solvent having affinity for both the polymer and the montmorillonite, followed by washing and drying, and hot-melt kneading is carried out for the polymer has been reported (Fall of 1995, Polymer Processing Technology Discussion Meeting, Lecture Material, pp. 53–54, Synthesis and Properties of PP Clay Hydrides).

Excellent dispersively can be achieved in the above-mentioned method, but the method involves many steps in the production process and is complex and not practical.

Furthermore, a composite material produced by dispersing a lamellar silicate with a low-density polyethylene used for films, etc. because of softness and transparency and having good processability using a very simple method has not been developed.

3. Problems to be Solved by the Invention

Based on the above background, the objective of the present invention is to produce a composite material by dispersing a lamellar silicate in a low-density polyethylene, which is a type of nonpolar polymer, and to provide a simple method for manufacturing thereof.

SUMMARY OF THE INVENTION

The present invention pertains to a low-density polyethylene-lamellar silicate composite material containing a low-density polyethylene, a lamellar silicate and a surfactant that remains liquid at room temperature; the above-mentioned low-density polyethylene is inserted between the silicate layers of the above-mentioned lamellar silicate.

Furthermore, the present invention is a method for manufacturing a low-density polyethylene-lamellar silicate composite material wherein a master batch is produced having a surfactant that remains liquid at room temperature between the layers of the lamellar silicate, and, subsequently, hot-melt mixing is performed for the above-mentioned master batch and a low-density polyethylene so as to insert the above-mentioned low-density polyethylene between the silicate layers of the above-mentioned lamellar silicate.

The present invention is more fully set forth in Japanese Patent Application No. 8-305510, filed Nov. 1, 1996, and in the remainder of this Specification.

DETAILED DESCRIPTION

Figure 1:
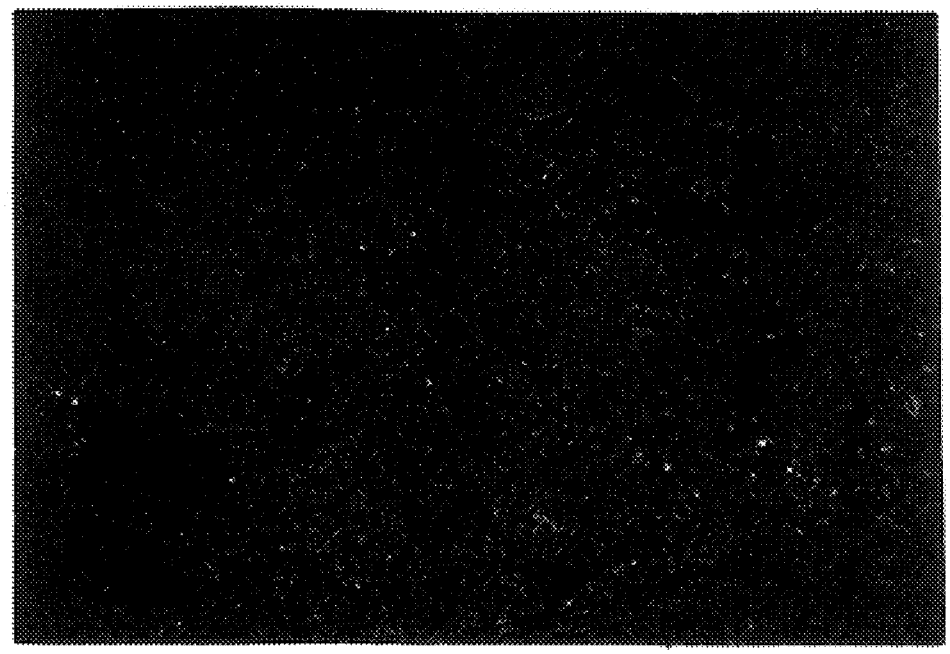
FIG. 1 The figure is an optical microscope photograph that shows the transparency of the composite material produced in Application Example 1 of the present invention and the magnification is 100×.

The low-density polyethylene of the present invention can be produced by polymerization of ethylene at a high temperature (180–200° C.) and under high pressure (1000–2000 atms) in the presence of a radical polymerzation catalyst such as oxygen.

In general, the thickness of the silicate layer of the lamellar silicate used in the present invention is in the range of 7–15 Å, and is composed of magnesium silicate and aluminum silicate layers. In specific terms, smectite clays such as montmorillonite, saponite, beidellite, nontronite, hectorite, and stephanite can be used; furthermore, vermiculite, halolite, mica, etc., can be used, and either natural or synthetic materials can be used. Furthermore, expandable fluorine mica, etc., can be mentioned. Among those listed above, smectite lamellar silicates are suitable, and montmorillonite is especially suitable.

Surfactant used in this invention must be liquid at room temperature. When surfactant that is solid at room temperature, for example, long-chain alkylamine, is to be inserted between layers of layered silicate, it becomes necessary in use to disperse the long-chain alkylamine in water and effect dissolution, thereafter, it is necessary to have a process to remove water content. Therefore, in this invention, surfactant that is liquid at room temperature is used, with no need for dispersion/dissolution in media such as water. For surfactants, there are cationic, anionic, and nonionic surfactants; for example, just as stearylamine, a long-chain alkylamine, is solid at room temperature, many of the cationic and anionic surfactants are solids at room temperature. Consequently, nonionic surfactants are ideal for use. A hydrophilic group frequently used in nonionic surfactants is ethylene oxide group ($-CH_2CH_2O-$). When hydrophobic alkyl groups are designated R, there are the ether type ($RO(CH_2CH_2O)_nH$) and the ester type ($RCOO(CH_2CH_2O)_nH$). As alkyl groups, there can be listed lauryl group, palmityl group, stearyl group, oleyl group. Among these, polyethyleneglycol oleyl ether is preferable. In order to have polyethyleneglycol oleyl ether in the liquid state at room temperature, the degree of polymerization of polyethyleneglycol is $n=2\sim50$.

Furthermore, an appropriate amount of paraffin having affinity for both the surfactant and nonpolar polymer can be added in addition to the above-mentioned components. When a surfactant that remains liquid at room temperature and the lamellar silicate are mixed, a liquid with a high viscosity is produced, thus, when a paraffin with a melting point of approximately 50° C. is added, handling becomes easy at the time of mixing with the above-mentioned low-density polyethylene.

In the manufacturing of the composite material of the present invention, hot-melt kneading can be performed for each of the components at the same time, but in order to achieve adequate dispersion of the lamellar silicate with the low-density polyethylene, a method in which mixing is performed for the above-mentioned lamellar silicate and surfactant using a mixer such as a two-roll or three-roll mixer to produce a master batch having the surfactant between the layers of the silicate, and further mixing with the low-density polyethylene is desirable. When additives such as paraffin are added, it is desirable to add them during production of the master batch. Hot-melt mixing can be performed using any conventional method, but in order to achieve adequate mixing, it is desirable to use a kneading machine having hot-melt kneading capacity. In specific terms, a biaxial (same direction of rotation or opposite direction of rotation) mixer, Yabusu kneader, a two-roll mixer, etc., can be mentioned.

EXAMPLES

The present invention is explained further with following application examples, but the present invention is not limited to these application examples.

Application Example 1

Stirring was performed for 4.0 g of montmorillonite (product of Kunimine Industries, Kunipia® F) and 8.0 g of polyethylene glycol oleyl ether (degree of polymerization of polyethylene glycol n=2) by a three-roll mixer for approximately 10 min at room temperature to produce a master batch. Subsequently, hot-melt mixing was performed for the master batch with 88 g of low-density polyethylene (product of Union Polymer Corp., low-density polyetle 339 (trade name)) to produce a composite material. The transparency of the material produced was examined with an optical microscope and recorded in a photograph (FIG. 1).

Application Example 2

Figure 2:
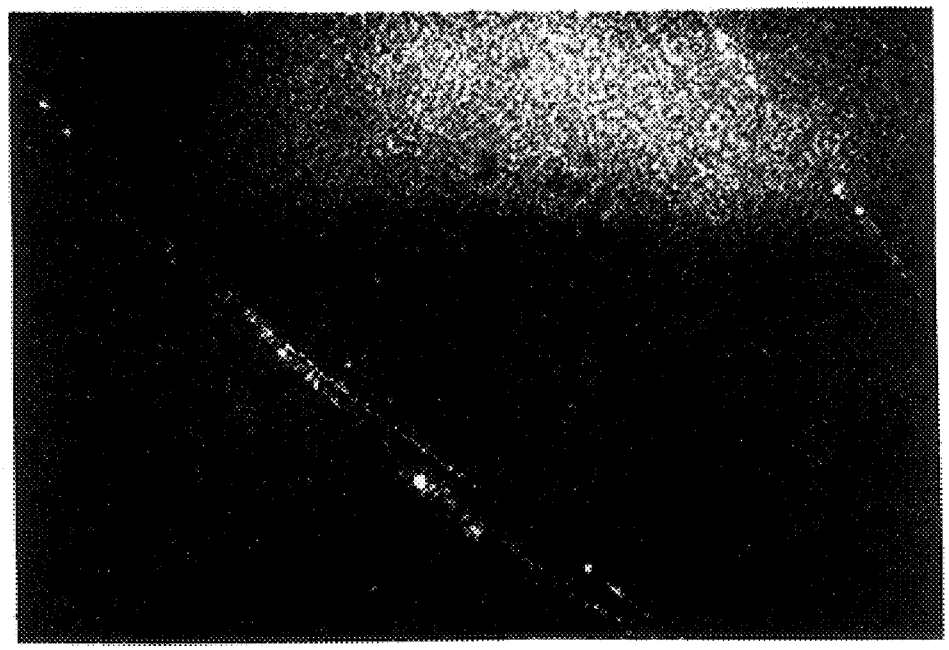
FIG. 2 The figure is an optical microscope photograph that shows the transparency of the composite material produced in Application Example 2 of the present invention and the magnification is 100×.

Polyethylene glycol oleyl ether (degree of polymerization of polyethylene glycol n=7) was used and the production of a composite material was performed as in the case of Application Example 1. The transparency of the material produced was evaluated with an optical microscope and recorded in a photograph (FIG. 2).

Application Example 3

Figure 3:
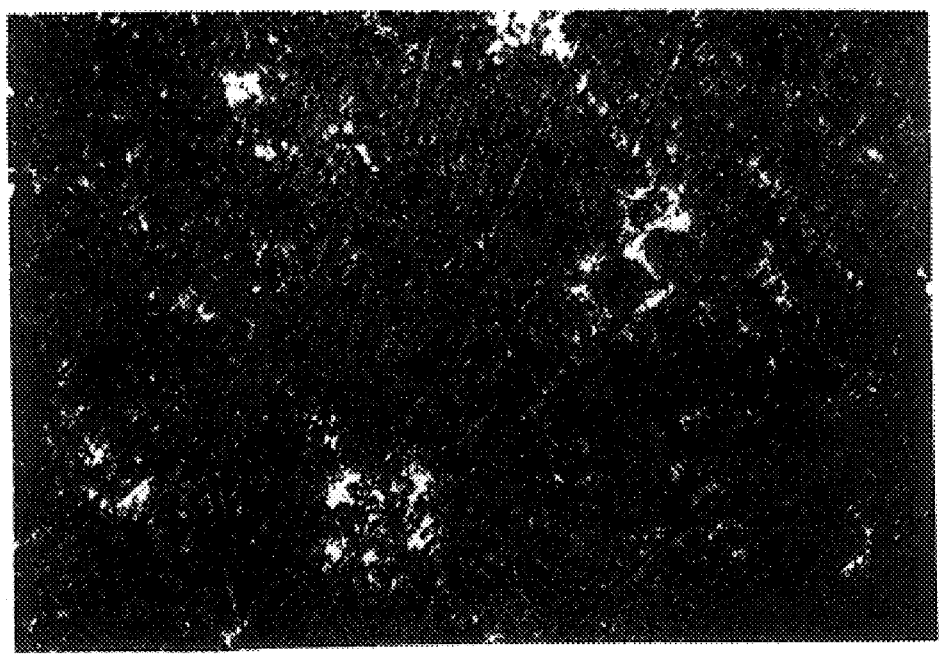
FIG. 3 The figure is an optical microscope photograph that shows the transparency of the composite material produced in Application Example 3 of the present invention and the magnification is 100×.

Stirring was performed for 4.0 g of montmorilionite (product of Kunimine Ind. Kunipia® F), 4.0 g of polyethylene glycol oleyl ether (degree of polymerization of the polyethylene glycol n=2), and 4.0 g of paraffin (melting point of 50° C.) by a three-roll mixer for approximately 10 min at room temperature to produce a master batch. Subsequently, hot-melt mixing was performed for the master batch with 88 g of low-density polyethylene (product of Union Polymer Corp., low-density polyethylene 339 (trade name)) to produce a composite material. The transparency of the material was examined with an optical microscope and recorded in a photograph (FIG. 3).

Application Example 4

Figure 4:
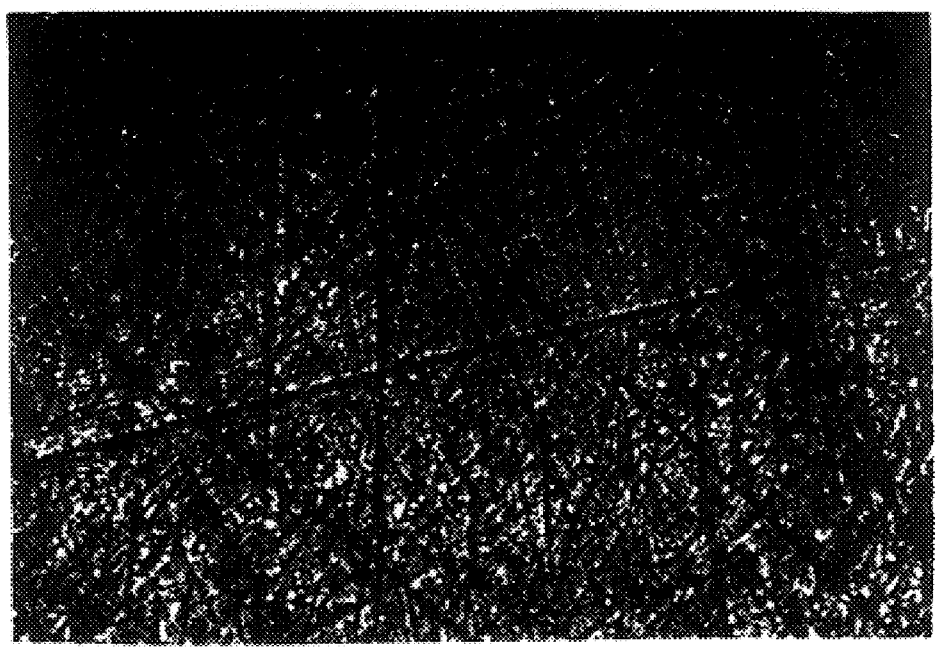
FIG. 4 The figure is an optical microscope photograph that shows the transparency of the composite material produced in Application Example 4 of the present invention and the magnification is 100×.

A surfactant that remains liquid at room temperature was used and a composite material was produced. The transparency of the material was examined by an optical microscope and recorded in a photograph (FIG. 4).

Control Example 1

Figure 5:
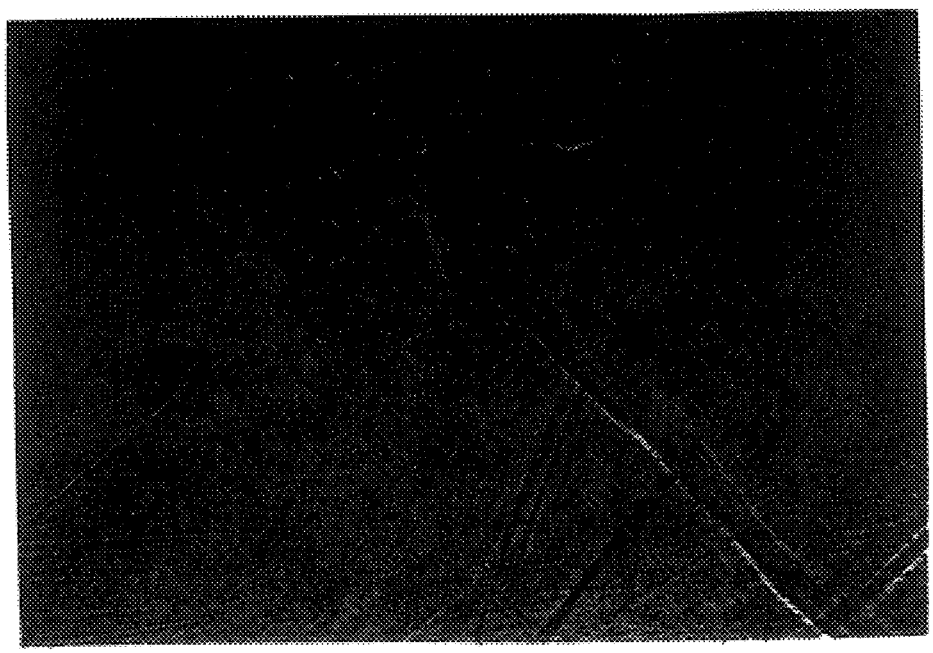
FIG. 5 The figure is an optical microscope photograph that shows the transparency of the composite material produced in Applcation Example 5 of the present invention and the magnification is 100×.

The transparency of the low-density polyethylene itself (product of Union Polymer Corp., low-density polyethylene 339 (trade name)) used in the application examples was examined by an optical microscope and recorded in a photograph (FIG. 5) to confirm the transparency of the material itself.

Comparative Example 1

Hot-melt mixing was performed for 4.0 g of montmorillonite (product of Kunimine Ind. Kunipia® F) and 96 g of low-density polyethylene pellets (product of Union Polymer Corp., low-density polyethylene 339 (trade name)) by a two-roll mixer. Subsequently, the transparency of the material produced was examined with an optical microscope and recorded in a photogaph (FIG. 6).

Figure 6:
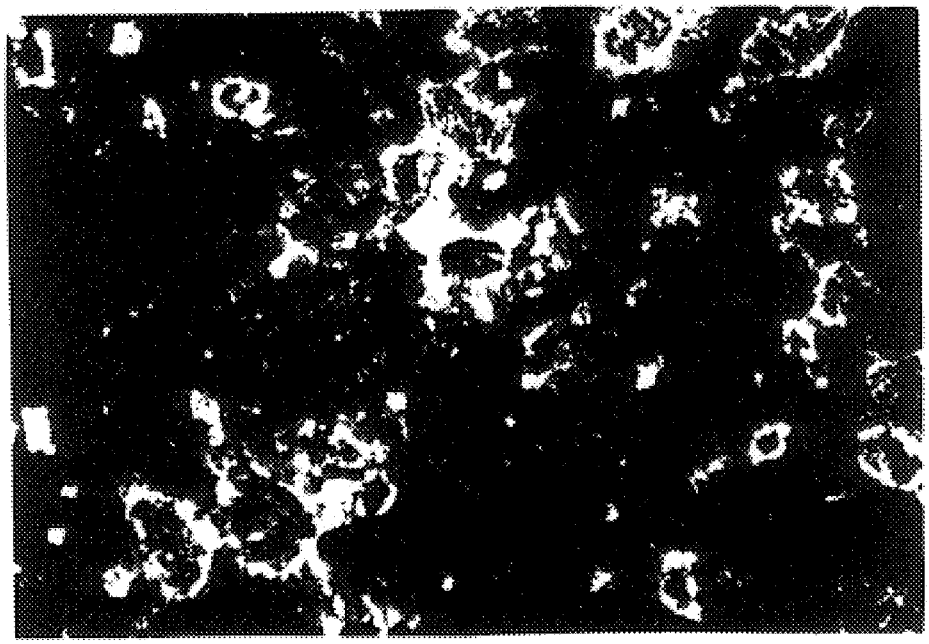
FIG. 6 The figure is an optical microscope photograph that shows the transparency of the composite material produced in Application Example 6 of the present invention and the magnification is 100×.

As shown in the optical microscope photograph of FIG. 6, in the case when a lamellar silicate alone is dispersed in a low-density polyethylene as in the case of Comparative Example 1, large solid blocks are observed, and the transparency is inadequate, but when dispersion was performed for a lamellar silicate with a low-density polyethylene in the presence of a surfactant, formation of large blocks was not observed, and the transparency was very good. Furthermore, it was further confirmed that dispersibility is not inhibited when paraffin was added as an additive as in the case of Application Examples 3 and 4.

Effect of the Invention

As described above, when mixing is performed for a lamellar silicate with a surfactant that remains liquid at room temperature, a master batch can be easily produced without using a solvent such as water, thus, drying and pulverization processes and thorough evaporation of the water are not required, and when hot-melt mixing is performed for the above-mentioned master batch with a low-density polyethylene, a composite material having a lamellar silicate thoroughly dispersed with the low-density polyethylene can be produced without using a complex process. According to the present invention, it is possible to increase the transparency of the low-density polyethylene-lamellar silicate composite material.

What is claimed is:

1. A low-density polyethylene-lamellar silicate composite material containing a low-density polyethylene, a lamellar silicate and a surfactant that remains liquid at room temperature, in which the low-density polyethylene is inserted between layers of the lamellar silicate.

2. A method for manufacturing a low-density polyethylene-lamellar silicate composite material comprising the steps of making a master batch by mixing a surfactant that remains liquid at room temperature and the lamellar silicate in the absence of water and then hot-melt mixing with a low-density polyethylene so as to insert the low-density polyethylene between the silicate layers of the lamellar silicate.

* * * * *